127,470

UNITED STATES PATENT OFFICE.

ROBERT J. EVERETT, OF BRIDGEPORT, CONNECTICUT, ASSIGNOR TO WILLIAM H. ADAMS, OF SAME PLACE.

IMPROVEMENT IN THE PREPARATION OF AMMONIA, SULPHUR, AND OTHER PRODUCTS FROM GAS-LIME.

Specification forming part of Letters Patent No. 127,470, dated June 4, 1872.

*To all whom it may concern:*

Be it known that I, ROBERT J. EVERETT, of London, England, temporarily residing in Bridgeport, in the county of Fairfield and State of Connecticut, have invented a new Process for Manufacturing Sulphur and Ammonia from the Refuse Resulting from Purifying Illuminating Gas; and I do hereby declare the following to be a full, clear, and exact description of the same.

In the ordinary methods of purifying illuminating gas from its sulphureted hydrogen, it is passed from the hydraulic mains, when impure, through the condensers, scrubbers, and then into purifiers, through successive layers of lime or oxide of iron placed on trays therein, the effect of which is to thoroughly rid the gas of its sulphureted hydrogen, and a certain portion of its ammonia, such impurities being held in the lime or oxide of iron, and now not utilized in any appreciable manner; but the lime and oxide of iron are removed from the purifiers when saturated with impurities, and thrown away as being of no further use.

The object of this invention is to utilize this waste by extracting the sulphur contained therein, together with any ammonia which may exist in it, either in the form of sulphate of ammonia or as nitrogen, which can be converted into ammonia.

The manner in which this operation is carried on is as follows: The spent oxide of iron is placed in retorts of any suitable metal, or fire-clay, or any other suitable fire material, molded into any convenient form and closed with air-tight doors, such retorts not being built on a level but on an incline, in order to permit any sulphur which may run from the mass to be thereby conducted into a vessel to receive it. Heat being applied, not to greatly exceed 600° Fahrenheit, such sulphur as is not reclaimed by melting and liquefaction is volatilized and collected in a chamber attached to the retorts. At the same time any salts of ammonia existing in the said spent oxide of iron are volatilized, and the nitrogen also therein contained is converted into ammonia, and also passes into the chamber in combination with a portion of the sulphur.

The chamber for collecting the above-named materials must be of considerable size in proportion to the number of retorts employed, and constructed of lead, brick, or wood, perfectly tight, and furnished with a leaden floor. Steam being admitted the vapors are thereby condensed, and such of them as assume a liquid form collect on the leaden floor of the chamber, and are conducted from thence into a suitable receptacle.

It is desirable to connect the chamber with a flue, in order that a moderate draught may be obtained when desired. When sufficient materials have been collected in the chamber it is opened, and its contents consisting of sulphur and salts of ammonia in a solid form are collected and washed with water or the liquor which has been collected from the chamber, whereby the sulphur, being insoluble, is deposited, and the salts of ammonia can be removed in a liquid form.

This solution will be found to consist of different combinations of ammonia with sulphur, and by simply boiling the same it can be oxidized into sulphate of ammonia, sulphur being at the same time precipitated. The sulphate of ammonia liquor so obtained, after being freed from the precipitated sulphur, either by subsidence or filtration, can then be evaporated into salt and afterward drained and prepared for use in the ordinary manner.

I do not wish to be understood as confining myself to the precise construction herein described in carrying out this process, as this may be varied without materially changing the process; but I do claim as my invention—

The process herein described for manufacturing sulphur and ammonia from the refuse resulting from the purifying of illuminating gas.

ROBERT J. EVERETT.

Witnesses:
 C. H. HEWETT,
 HENRY C. BEACH.